United States Patent Office 2,834,742
Patented May 13, 1958

2,834,742
ELASTIC INSULATING TAPE

Johnny N. Scott and Rufus Vernon Jones, Bartlesville, Okla., assignors to Phillips Petroleum Company, a corporation of Delaware No Drawing. Application February 15, 1954
Serial No. 410,418

5 Claims. (Cl. 260—28.5)

This invention relates to a modified monoolefin and/or diolefine polymer composition. In one aspect it relates to a method of preparing such a composition. In another aspect it relates to an insulating or coating material and a method of preparing same.

The compositions of this invention are useful as insulating tape, as materials for impregnating textile materials, either synthetic or nonsynthetic, e. g. fiber glass, and as waterproof coatings for walls, pipes, and the like.

The novel composition, according to this invention, comprises a minor proportion of an asphalt and a major proportion of a material selected from the group consisting of plastic or elastomeric polymers of ethylene and plastic or elastomeric, at least partially hydrogenated, polymers and copolymers of conjugated dienes.

The proportion of the asphalt is preferably within the range 5 to 45 weight percent, more preferably 20 to 45 weight percent, based on asphalt plus polymer.

Although a wide range of asphalt types are operative, an asphalt having a high resin content and a low oil content is preferred. Thus an asphalt having a specific gravity in the range 1.0 to 1.1; a ring-and-ball softening point in the range 50 to 225° F., preferably 100 to 200° F.; and a penetration value (ASTM Method D5-49) in the range 10 to 200 at 77° F. is preferred. Asphalts known as "albino" asphalts are very desirable for the purposes of this invention. The properties of the asphalt must be such that the asphalt does not bleed from the blend.

The ethylene polymer utilized according to this invention is a solid polymer of ethylene having a melt index (ASTM Method D1238-52T) in the range 0.4 to 25. The melt index has been correlated with molecular weight. The above range of melt index corresponds to a molecular weight range from 14,000 to 35,000.

The hydrogenated diolefin polymers utilized according to this invention are selected from the group consisting of hydrogenated homopolymers of butadiene and hydrogenated copolymers of butadiene and styrene, said copolymers having been prepared from a butadiene-styrene mixture containing not more than 30 parts by weight of styrene per 100 parts of butadiene. The polymers and copolymers are formed by emulsion polymerization at temperatures in the range —5° F. to 140° F., preferably 20 to 60° F., by methods well known in the art. The polymers and copolymers prior to hydrogenation, have a Mooney viscosity (ML-4) below 40 at 212° F. The hydrogenation is conducted, after vacuum-drying the polymer or copolymer, at a temperature in the range 75 to 1000° F., preferably 300 to 600° F., a pressure in the range 0 to 3000 p. s. i., preferably 100 to 1000 p. s. i., in the presence of a nickel-kieselguhr catalyst. The catalyst is prepared by depositing a reducible nickel compound on kieselguhr and at least partially reducing said compound with hydrogen. The polymer or copolymer is suspended or dissolved in a solvent, e. g. a cyclic hydrocarbon such as cyclohexane, methylcyclohexane, decalin, benzene, or toluene, a cyclic ether such as dioxane, or an isoparaffin such as isooctane, isoheptane, and the like. The catalyst is suspended in the solution, and the mixture is hydrogenated at the above-described conditions. The amount of catalyst in the hydrogenation mixture is preferably in the range 2 to 30 weight percent, based on polymer or copolymer.

The hydrogenated polymers or copolymers, recovered by flashing the solvent or precipitating with an alcohol such as isopropanol, are initially white but become colorless and transparent after being molded. They are thermoplastic. They have a tensile strength in the range 750 to 4000 p. s. i. at 80° F. and an elongation value greater than 500 percent.

It is preferred that the polymer or copolymer be incompletely saturated by hydrogenation, i. e. that the residual unsaturation be from 5 to 30 percent of that of the original, unhydrogenated polymer or copolymer. The degree of saturation can be regulated by controlling the hydrogenation conditions, as set forth herein, to produce the desired degree of hydrogenation. The optimum conditions can readily be determined by trial, by one skilled in the art, in the light of this disclosure.

The compositions of this invention can be prepared by directly mixing the alphalt with the polymer in the stated proportions, for example by heating the components to render them fluid or plastic and subsequently blending. The blending can be effected by kneading or milling. Alternatively, the components can be dissolved in suitable solvents, of the type disclosed in connection with the preparation of the hydrogenated polymer, the solutions can be blended in the stated proportions, and the solvent removed by vaporization.

The compositions according to this invention have a tensile strength of at least 120 p. s. i., an elongation value of at least 500 percent in many instances, and sufficient tack to adhere to surfaces, such a metallic surfaces, to which they are applied. Compositions containing from 35 to 45 weight percent of asphalt have a higher degree of tack than those containing less asphalt and are therefore more desirable as electrical insulating tape. A composition comprising 40 parts by weight of asphalt and 60 parts by weight of hydrogenated butadiene polymer has a high degree of tack and good elongation and tensile strength. When formed into a tape, it can be wound tightly onto wire or around a pipe, forming a tight strongly adhering coating. No backing or other fibrous material is needed, although such can be used if desired. Products containing 50 percent or more of asphalt are unsuitable for the ultimate uses discussed herein, because they are too sticky and lack strength and elasticity. They are basically asphalts and therefore do not have the properties of the compositions of this invention.

Also, the compositions of this invention can be applied, in solution, to surfaces to form protective coatings thereon. Suitable solvents are those already disclosed herein. The solutions can be applied by brushing, spraying, and other known methods.

Example I

Hydrogenated polybutadiene having an unsaturation of 16.9 percent, prepared, as previously described, from 41° F. emulsion polymerized butadiene having a Mooney value (ML-4) of 20, was blended with asphalt obtained from the propane fractionation of a lubricating oil stock.

The asphalt had a specific gravity (60/60F.) of 1.027, penetration at 77° F. of 17, and softening point (ring and ball) of 138° F. The hydrogenated polybutadiene and the asphalt were each dissolved in methylcyclohexane at temperature in the range from 185–212° F., the solutions were blended, and the blend was drum-dried. Four different blends were prepared and evaluated. Hydrogenated polybutadiene was included as a control. The samples were evaluated and the following results obtained:

| Asphalt, Parts by weight | Hydrogenated Polybutadiene, Parts by weight | Density[1] | Tensile Strength,[2] p. s. i. | Elongation,[2] percent | Flex[3] Point, ° F. |
|---|---|---|---|---|---|
| 25 | 75 | 0.944 | Did not break[4] | 1,100+ | −80. |
| 40 | 60 | 0.940 | 122 | 715 | −66. |
| 60 | 40 | 0.969 | 113 | 550 | too weak. |
| 75 | 25 | 0.984 | 84 | 900 | Do. |
| 0 | 100 | 0.885 | 910 | 1,000 | |

[1] Densities were determined by floating the sample in carbon tetrachloride and titrating with methylcyclohexane until the sample density was equal to the specific gravity of the liquid mixture as indicated by a very slow sinking of the sample. The specific gravity of this liquid was then measured on a Westphal balance.
[2] Tensile strength and per cent elongation were measured on a W. C. Dillon tensile machine. Bars were cut from molded sheets and pulled at the rate of approximately 4 inches per minute. (The machine is capable of pulling test specimens up to 1,000–1,100 percent elongation. For this reason some tesnile strength values are reported as "no break.")
[3] "Flex point" is defined as the lowest temperature at which a material is useful as a non-rigid plastic (135,000 p. s. i. stiffness modulus). These points were determined on a Tinius-Olsen torsion stiffness tester.
[4] 354 p. s. i. at 1,000 percent elongation.

The asphalt and hydrogenated polybutadiene were compatible in each case, i. e., the asphalt did not bleed from the blend.

The compositions containing 25 and 40 weight percent asphalt were satisfactory for the manufacture of insulating tape, whereas the compositions containing 60 or more parts by weight of asphalt were not, because of low tensile strength. Furthermore the first-mentioned compositions had excellent low-temperature properties, whereas the latter-mentioned ones were too weak for flex point measurements. The asphalt-free hydrogenated polymer had subtantially no tack.

*Example II*

Three blends of commercial polyethylene (molecular weight 19,000) with the asphalt described in Example I were prepared by the method of Example I. The blends were evaluated, and also polyethylene alone. The following results were obtained.

| Asphalt, Parts by weight | Polyethylene, Parts by weight | Melting Point[1] | Density | Tensile Strength, p. s. i. | Elongation, Percent | Flex Point, ° F. |
|---|---|---|---|---|---|---|
| 25 | 75 | 206±2 | 0.946 | Did not break[2] | 1,000+ | −20 |
| 50 | 50 | 201±2 | 0.967 | 23.2 | 80 | |
| 75 | 25 | Very soft | 0.987 | 20 | 75 | |
| 0 | 100 | 212±1 | 0.920 | 1,930 | 1,000 | −45 |

[1] Melting points were determined by the cooling curve method which shows the temperature at which heat of crystallization is evolved.
[2] 1,443 p. s. i. at 1,000 percent elongation.

The density, tensile strength, elongation, and flex point data were obtained as described in Example I.

There was bleeding of the asphalt in the 50/50 and 75/25 asphalt/polyethylene blends indicating that the materials were not compatible in these ratios. Also, these materials had insufficient strength for use as insulating tape.

*Example III*

Blends were prepared as described in Example I using 25 parts of each of three different asphalts and 75 parts of either polyethylene (described in Example II) or hydrogenated polybutadiene (described in Example I).

The following table shows the density, tensile strength, and elongation data:

| Asphalt, Parts by weight | Polyethylene, Parts by weight | Hydrogenated Polybutadiene, Parts by weight | Density | Tensile Strength, p. s. i. | Elongation, percent |
|---|---|---|---|---|---|
| 25[1] | 75 | | 0.946 | no break[4] | 1,000+ |
| 25[2] | 75 | | 0.945 | 233 | 30 |
| 25[3] | 75 | | 0.938 | 510 | 70 |
| 25[1] | | 75 | 0.944 | no break[5] | 1,100+ |
| 25[2] | | 75 | 0.934 | 350 | 900 |
| 25[3] | | 75 | 0.939 | 197 | 750 |

[1] Sp. gr., 1.027. Softening point, 138° F. Penetration, 19 at 77° F.
[2] Catalytically blown asphalt (produced by air-blowing refinery asphalt in presence of about 2 percent phosphorus pentoxide catalyst). Sp. gr. 1.0187. Softening point, 178° F. Penetration, 60 at 77° F.
[3] Sp. gr. 1.0064. Softening point, 138.5° F. Penetration, 85 at 77° F.
[4] 1,443 p. s. i. at 1,000 percent elongation.
[5] 354 p. s. i. at 1,000 percent elongation.

The data show that wide variety of asphalts can be used according to this invention. They also show that asphalts of high specific gravity, high softening point, and low penetration value (high resin content) produce satisfactory results.

*Example IV*

Electrical properties were determined on the 25/75 blend of asphalt with hydrogenated polybutadiene described in Example I and also on the hydrogenated polybutadiene. The following results were obtained:

| | 1 kc.[1] | | 1 mc.[2] | |
|---|---|---|---|---|
| | K[3] | D[4] | K[3] | D[4] |
| Blend | 2.27 | <0.0005 | 2.24 | 0.002 |
| Hydrogenated polybutadiene | 2.37 | 0.002 | 2.3 | 0.004 |

[1] Kilocycle.
[2] Megacycle.
[3] Dielectric constant.
[4] Dissipation factor.

These results show that the insulating properties of the blend were better than those of the hydrogenated polybutadiene as evidenced by the lower dielectric constant and the lower dissipation factor.

*Example V*

This example shows that a solid propylene polymer prepared by polymerizing propylene in the presence of a chromium oxide-alumina or a chromium oxide-silica-alumina catalyst as described in copending application Serial No. 333,576, filed January 27, 1953, can be used to impart additional tack to compositions prepared according to this invention. The proportion of polypropylene can be in the range 5 to 30 weight percent of the ternary mixture, the proportion of asphalt being from 5 to 30 weight percent, and the remainder of the ternary mixture being partially hydrogenated butadiene polymer or copolymer or solid polyethylene, as herein described.

A composition according to this invention was prepared by blending, as described in Example I, 25 parts by weight of polypropylene, 25 parts by weight of asphalt, and 50 parts by weight of a hydrogenated butadiene polymer prepared as described in Example I. This composition had a tensile strength of 715 p. s. i., an elongation of 700 percent, and a density of 0.936. It had sufficient tack to make it satisfactory for use as an insulating tape.

Also according to the invention, hydrogenated butadiene polymers or copolymers can be mixed with polyethylene in any desired proportion to form the major component which is blended with a minor proportion asphalt as described.

While certain compositions, structures, process steps, and examples have been described for purposes of illustration, the invention is not limited thereto. The essence of the invention is a composition comprising a minor proportion of an asphalt and a major proportion of a polymeric material selected from the group consisting of solid polyethylenes and hydrogenated polymers and copolymers of butadiene and a method of producing such a composition. Variation and modification within the scope of the disclosure and the claims are possible. Thus suitable fillers, tackifiers, extenders, plasticizers, preservatives, and/or antioxidants can be added, as desired, to the compositions within the scope of the invention.

We claim:

1. An elastic insulating tape having a tensile strength of at least 120 p. s. i. and prepared by blending from 25 to 45 weight percent of an asphalt with from 75 to 55 weight percent of a polymeric material selected from the group consisting of polyethylene having a melt index from 0.4 to 25 and solid hydrogenated polymers of butadiene.

2. A tape according to claim 1 wherein said polymeric material is a partially hydrogenated copolymer of butadiene and styrene.

3. An elastic insulating tape comprising a compatible blend of from 25 to 45 weight percent of an asphalt and from 75 to 55 weight percent of a partially hydrogenated polymer of butadiene having a residual unsaturation in the range 5 to 30 percent, said tape having a tensile strength of at least 120 p. s. i. an elongation value of at least 500 percent, and sufficient tack to cause adherence to a metallic surface.

4. An elastic insulating tape according the claim 3 wherein said hydrogenated homopolymer has been prepared by hydrogenating, at a temperature in the range 300 to 600° F. and a pressure in the range 100 to 1000 p. s. i., in the presence of a reduced nickel-kieselguhr catalyst, a homopolymer of butadiene having a Mooney viscosity less than 40 prepared by emulsion polymerization.

5. An elastic, insulating tape comprising a compatible blend of from 25 to 45 weight percent of an asphalt and from 75 to 55 weight percent of a polyethylene having a melt index in the range 0.4 to 25, said tape having a tensile strength of at least 120 p. s. i., and sufficient tack to cause said tape to adhere to a metallic surface.

References Cited in the file of this patent

UNITED STATES PATENTS

| 2,610,956 | Derksen et al. | July 12, 1949 |

FOREIGN PATENTS

| 533,520 | Great Britain | Feb. 14, 1941 |

OTHER REFERENCES

Plastics (U. S.), December 1948, pages 12 and 29.

"Alathon Polythene Resins for Paper Coating and Specialty Applications" publication of E. I. du Pont de Nemours and Co., Wilmington, Del., Polychemicals Dept. Copyright 1950, page 11.